(12) United States Patent
Mazour et al.

(10) Patent No.: US 12,194,954 B2
(45) Date of Patent: Jan. 14, 2025

(54) INTEGRATED SEAT BELT ENERGY MANAGEMENT LOOP

(71) Applicant: Polaris Industries Inc., Medina, MN (US)

(72) Inventors: Scott Mazour, Detroit Lakes, MN (US); Parag P. Patil, Woodbury, MN (US); James A J Holroyd, Stillwater, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/604,998

(22) Filed: Mar. 14, 2024

(65) Prior Publication Data

US 2024/0308462 A1 Sep. 19, 2024

Related U.S. Application Data

(60) Provisional application No. 63/452,746, filed on Mar. 17, 2023.

(51) Int. Cl.
*B60R 22/28* (2006.01)
*B60R 22/18* (2006.01)
*B60R 22/34* (2006.01)

(52) U.S. Cl.
CPC .............. *B60R 22/28* (2013.01); *B60R 22/18* (2013.01); *B60R 22/34* (2013.01); *B60R 2022/1831* (2013.01)

(58) Field of Classification Search
CPC .......... B60R 22/28; B60R 22/18; B60R 22/34; B60R 2022/1831
See application file for complete search history.

(56) References Cited

U.S. PATENT DOCUMENTS

| | | |
|---|---|---|
| 4,033,594 A | 7/1977 | Lindblad |
| 4,373,749 A | 2/1983 | Miki et al. |
| 4,469,351 A | 9/1984 | Matsuoka |
| 4,607,864 A | 8/1986 | Kouketsu et al. |
| 4,645,234 A | 2/1987 | Koide |
| 4,648,625 A | 3/1987 | Lynch |
| 5,286,057 A | 2/1994 | Forster |
| 5,308,116 A | 5/1994 | Zawisa et al. |
| 6,485,055 B1 * | 11/2002 | Swayne .................. B60N 2/289 280/801.1 |
| 6,517,154 B2 * | 2/2003 | Sawamoto .............. B60R 22/16 296/68.1 |
| 6,527,299 B2 | 3/2003 | Specht et al. |

(Continued)

*Primary Examiner* — Faye M Fleming
(74) *Attorney, Agent, or Firm* — Faegre Drinker Biddle & Reath LLP

(57) ABSTRACT

A seat belt energy management loop to reduce off-axis loading is disclosed. The seat belt energy management loop includes a substantially flat bracket welded to the chassis of a vehicle and including a plurality of openings for mounting a roll hoop and a seat belt retractor to the bracket. An integral loop is formed as an integral part of the bracket and extends from the bracket in substantially perpendicular relation to the bracket. The integral loop includes a seat belt guide segment extending from the bracket, a pair of curved end segments extending from the seat belt guide segment, and a straight segment extending between the pair of curved end segments, together forming a seat belt opening through which a retractable seat belt of the retractor extends.

34 Claims, 7 Drawing Sheets

(56) References Cited

U.S. PATENT DOCUMENTS

| | | | |
|---|---|---|---|
| 7,118,133 B2 | 10/2006 | Bell et al. | |
| 7,131,669 B2 | 11/2006 | Morita et al. | |
| 7,658,395 B2 | 2/2010 | Bagnariol et al. | |
| 7,822,514 B1 | 10/2010 | Erickson | |
| 7,871,106 B2 | 1/2011 | Leonard et al. | |
| 7,883,136 B2 | 2/2011 | Tomolillo et al. | |
| 7,971,908 B2 | 7/2011 | Hathaway et al. | |
| 8,029,021 B2 | 10/2011 | Leonard et al. | |
| 8,205,910 B2 | 6/2012 | Leonard et al. | |
| 8,272,460 B2 | 9/2012 | Song et al. | |
| 8,328,235 B2 | 12/2012 | Schneider et al. | |
| 8,387,734 B2 | 3/2013 | Krosschell et al. | |
| 8,640,814 B2 | 2/2014 | Deckard et al. | |
| 8,651,214 B2 | 2/2014 | Orpen et al. | |
| 8,944,449 B2 | 2/2015 | Hurd et al. | |
| 8,948,926 B2 | 2/2015 | Erickson | |
| 8,973,693 B2 | 3/2015 | Kinsman et al. | |
| 8,997,908 B2 | 4/2015 | Kinsman et al. | |
| 9,004,510 B2 | 4/2015 | Leonard et al. | |
| 9,022,160 B2 | 5/2015 | Smith et al. | |
| 9,063,832 B2 | 6/2015 | Schlangen et al. | |
| 9,075,699 B2 | 7/2015 | Wetterlund | |
| 9,150,182 B1 | 10/2015 | Schlangen et al. | |
| 9,152,607 B2 | 10/2015 | Wetterlund et al. | |
| 9,205,717 B2 | 12/2015 | Brady et al. | |
| 9,393,894 B2 | 7/2016 | Steinmetz et al. | |
| 9,394,859 B2 | 7/2016 | Parnofiello et al. | |
| 9,440,504 B2 | 9/2016 | Bagnariol et al. | |
| 9,527,362 B2 | 12/2016 | Brady et al. | |
| 9,540,052 B2 | 1/2017 | Burt et al. | |
| 9,592,782 B2 | 3/2017 | Raska et al. | |
| 9,610,918 B2* | 4/2017 | Hayashi | B60R 22/18 |
| 9,623,912 B2 | 4/2017 | Schlangen | |
| 9,650,078 B2 | 5/2017 | Kinsman et al. | |
| 9,701,346 B2 | 7/2017 | Deckard et al. | |
| 9,713,976 B2 | 7/2017 | Miller et al. | |
| 9,725,023 B2 | 8/2017 | Miller et al. | |
| 9,776,481 B2 | 10/2017 | Deckard et al. | |
| 9,789,909 B2 | 10/2017 | Erspamer et al. | |
| 9,878,650 B2 | 1/2018 | Reed et al. | |
| 10,005,335 B2 | 6/2018 | Brady et al. | |
| 10,017,090 B2 | 7/2018 | Franker et al. | |
| 10,037,304 B2 | 7/2018 | Smith et al. | |
| 10,124,709 B2 | 11/2018 | Bohnsack et al. | |
| 10,160,436 B2 | 12/2018 | Malone et al. | |
| 10,183,558 B2 | 1/2019 | Deckard et al. | |
| 10,183,605 B2 | 1/2019 | Weber et al. | |
| 10,196,033 B2 | 2/2019 | Loew et al. | |
| 10,214,066 B2 | 2/2019 | Teachout et al. | |
| 10,232,201 B2* | 3/2019 | Wells | A62B 35/0068 |
| 10,246,153 B2 | 4/2019 | Deckard et al. | |
| 10,315,719 B2 | 6/2019 | Quade et al. | |
| 10,384,722 B2 | 8/2019 | Leonard et al. | |
| 10,408,116 B2 | 9/2019 | Reeves et al. | |
| 10,427,578 B2 | 10/2019 | Deckard et al. | |
| 10,450,006 B2 | 10/2019 | Kinsman et al. | |
| 10,479,422 B2 | 11/2019 | Hollman et al. | |
| 10,486,748 B2 | 11/2019 | Deckard et al. | |
| 10,640,080 B2* | 5/2020 | Choi | B60R 22/28 |
| 10,640,101 B2 | 5/2020 | Malone et al. | |
| 10,780,949 B2 | 9/2020 | Crain et al. | |
| 10,793,226 B2 | 10/2020 | Crain et al. | |
| 10,870,465 B2 | 12/2020 | Crain et al. | |
| 10,894,525 B2 | 1/2021 | Holroyd et al. | |
| 10,915,600 B2 | 2/2021 | Smith et al. | |
| 10,960,937 B2 | 3/2021 | Novotny et al. | |
| 10,960,941 B2 | 3/2021 | Endrizzi et al. | |
| 10,974,790 B2 | 4/2021 | Hosaluk et al. | |
| 10,994,645 B2 | 5/2021 | Deckard et al. | |
| 10,994,785 B2 | 5/2021 | Deckard et al. | |
| 11,066,105 B2 | 7/2021 | Lutz et al. | |
| 11,097,613 B2 | 8/2021 | Hurd et al. | |
| 11,104,384 B2 | 8/2021 | Kinsman et al. | |
| 11,124,036 B2 | 9/2021 | Brady et al. | |
| 11,173,808 B2 | 11/2021 | Swain et al. | |
| 11,192,597 B2 | 12/2021 | Peterson et al. | |
| 11,235,814 B2 | 2/2022 | Schlangen et al. | |
| 11,254,372 B2 | 2/2022 | Leonard et al. | |
| 11,260,712 B2 | 3/2022 | Bagnariol et al. | |
| 11,273,881 B2 | 3/2022 | Deckard et al. | |
| 11,370,266 B2 | 6/2022 | Borud et al. | |
| 11,400,784 B2 | 8/2022 | Brady et al. | |
| 11,400,785 B2 | 8/2022 | Brady et al. | |
| 11,400,786 B2 | 8/2022 | Brady et al. | |
| 11,400,787 B2 | 8/2022 | Brady et al. | |
| 11,400,914 B2 | 8/2022 | Malone et al. | |
| 11,529,913 B2 | 12/2022 | Weed et al. | |
| 11,572,110 B2 | 2/2023 | Levin et al. | |
| 11,634,060 B2 | 4/2023 | Bjerketvedt et al. | |
| 11,718,240 B2 | 8/2023 | Kelso et al. | |
| 11,752,860 B2 | 9/2023 | Fields et al. | |
| 11,753,087 B2 | 9/2023 | Peterson et al. | |
| 11,760,304 B2 | 9/2023 | Hicke et al. | |
| 11,780,326 B2 | 10/2023 | Schlangen et al. | |
| 11,787,354 B2 | 10/2023 | Krosschell et al. | |
| 11,834,125 B2 | 12/2023 | Bishop et al. | |
| 11,872,866 B2 | 1/2024 | Bagnariol et al. | |
| 11,912,337 B2 | 2/2024 | Kinsman et al. | |
| 11,970,036 B2 | 4/2024 | Brady et al. | |
| 11,987,288 B2 | 5/2024 | Thomas et al. | |
| 12,005,963 B2 | 6/2024 | Clark et al. | |
| 12,012,027 B2 | 6/2024 | Bjerketvedt et al. | |
| 12,012,054 B2 | 6/2024 | Shaughnessy et al. | |
| 12,017,702 B2 | 6/2024 | Erspamer et al. | |
| 12,030,445 B2 | 7/2024 | Weed et al. | |
| 2020/0130636 A1 | 4/2020 | Moeker | |
| 2020/0130640 A1 | 4/2020 | Yamamoto | |
| 2021/0197915 A1 | 7/2021 | Bishop et al. | |
| 2021/0263513 A1 | 8/2021 | Liu et al. | |
| 2021/0323515 A1 | 10/2021 | Scheuerell et al. | |
| 2022/0123570 A1 | 4/2022 | Fuchs et al. | |
| 2022/0306222 A1 | 9/2022 | Deckard et al. | |
| 2022/0315115 A1 | 10/2022 | Lyons et al. | |
| 2023/0064416 A1 | 3/2023 | Rubanovich et al. | |
| 2023/0093742 A1 | 3/2023 | Rubanovich et al. | |
| 2023/0102266 A1 | 3/2023 | Crain et al. | |
| 2023/0174181 A1 | 6/2023 | Johnston et al. | |
| 2023/0226928 A1 | 7/2023 | Barnett et al. | |
| 2023/0226995 A1* | 7/2023 | Somekawa | B60R 22/18 297/468 |
| 2023/0271661 A1 | 8/2023 | Rhodes et al. | |
| 2023/0322076 A1 | 10/2023 | Frank et al. | |
| 2023/0339541 A1 | 10/2023 | Nysse et al. | |
| 2023/0406438 A1 | 12/2023 | Bishop et al. | |
| 2024/0012411 A1 | 1/2024 | Johnson et al. | |
| 2024/0075859 A1* | 3/2024 | Murase | B60R 22/26 |

\* cited by examiner

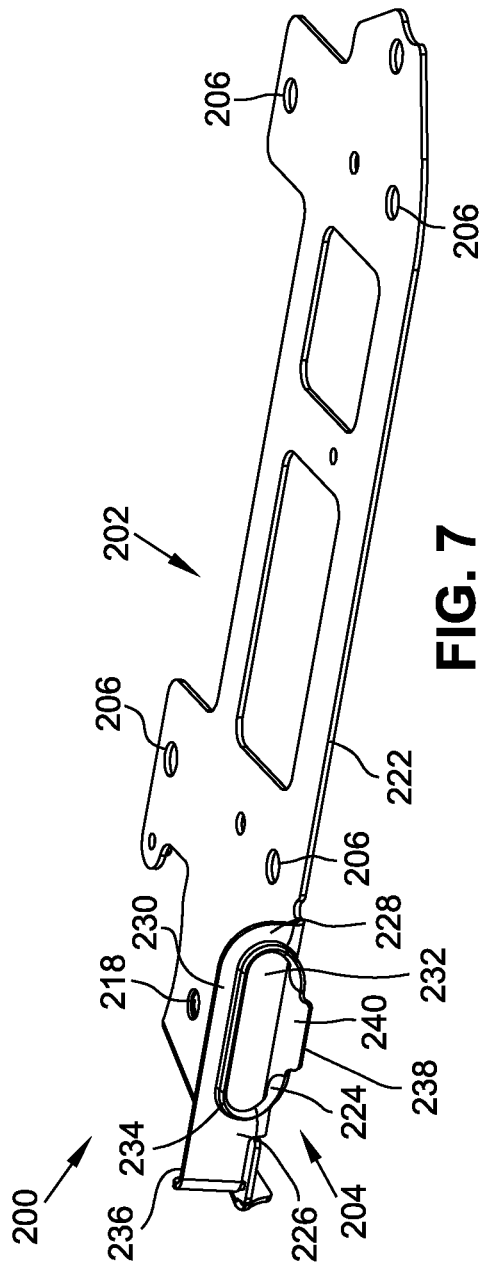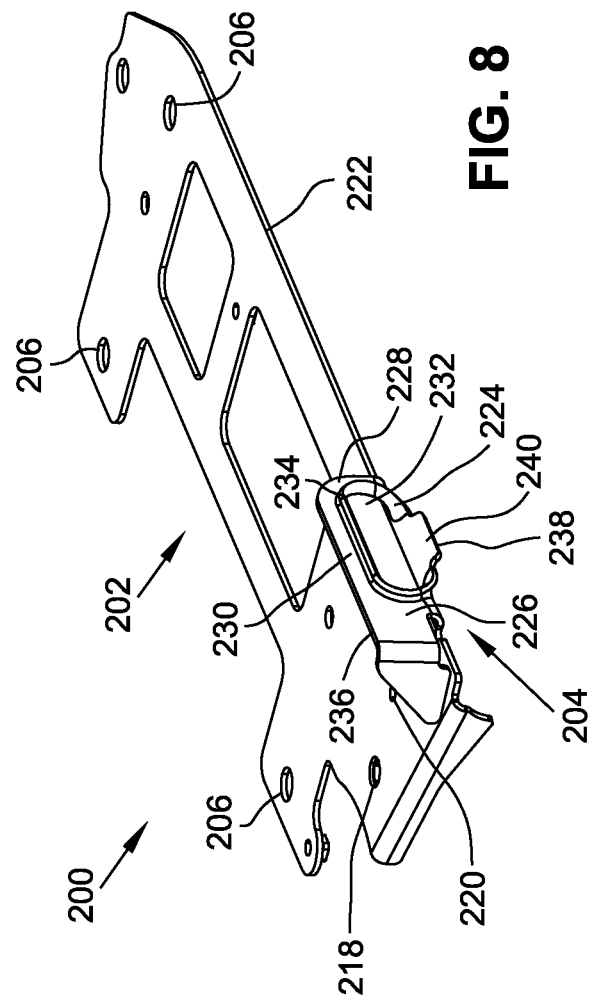

INTEGRATED SEAT BELT ENERGY MANAGEMENT LOOP

CROSS-REFERENCE TO RELATED APPLICATION

The present application claims the benefit of U.S. Provisional Application No. 63/452,746, entitled "INTEGRATED SEAT BELT ENERGY MANAGEMENT LOOP," filed on Mar. 17, 2023, which is incorporated by reference herein for all purposes in its entirety.

TECHNICAL FIELD

The present disclosure relates to restraint systems, and more particularly, to a seat belt energy management loop employed in a restraint system.

BACKGROUND

This section provides background information related to the present disclosure which is not necessarily prior art. Restraint systems for vehicles are well known. These restraint systems generally include a seat belt having a seat belt retractor and a latch. The seat belt can be latched and unlatched relative to the vehicle occupant. The retractor can allow the belt to be extended and retracted during latching and unlatching of the vehicle occupant. During restraint of a vehicle occupant, the seat belt, retractor, and latch are subject to various loads. To carry these loads, the retractor and latch are generally secured to a chassis of the vehicle. In some instances, it may be desirable to share or manage off-axis loads on these components.

SUMMARY

According to one embodiment of the present disclosure, a seat belt energy management loop is provided, comprising: a substantially flat bracket having a plurality of openings positioned and sized to receive a corresponding plurality of bolts for attaching a roll hoop to the bracket, a retractor mounting opening, and a retractor engagement opening positioned to receive a positioning tang of a retractor to align the retractor with the retractor mounting opening; and an integral loop formed as an integral part of the bracket and extending from the bracket in substantially perpendicular relation to the bracket, the integral loop including a seat belt guide segment extending from the bracket, a pair of curved end segments extending from the seat belt guide segment, and a straight segment extending between the pair of curved end segments, the seat belt guide segment, the pair of curved end segments and the straight segment forming a seat belt opening through which a retractable seat belt of the retractor extends when the bracket is attached to a chassis of a vehicle. In one aspect of this embodiment, the bracket is configured to be welded to the chassis of the vehicle. In another aspect, the bracket includes an inner mounting portion including a first pair of openings for receiving a first pair of bolts for mounting the roll hoop to the bracket and an outer mounting portion including a second pair of openings for receiving a second pair of bolts for mounting the roll hoop to the bracket. In a variant of this aspect, the inner mounting portion is connected to the outer mounting portion by a forward connecting portion and a rearward connecting portion. In a further variant, the integral loop extends from a forward edge of the inner mounting portion. In another aspect, the retractor mounting opening includes an integral boss configured to receive a bolt for mounting the retractor to the bracket. In still another aspect, the seat belt opening is substantially oval and has an elongated axis that is substantially parallel to the seat belt guide segment and the straight segment. In another aspect of this embodiment, the integral loop further includes a curved lip that extends from the first curved end segment, the second curved end segment, and the straight segment around the perimeter of the seat belt opening. In a variant of this aspect, the curved lip extends forwardly away from the bracket and includes an inner convex surface that faces the seat belt opening. In another variant, the seat belt guide segment of the integral loop includes a curved flange that is integral with the curved lip and extends outwardly and downwardly from the bracket, the curved flange including an upper convex surface that faces the seat belt opening. In another aspect, the integral loop is positioned relative to the retractor to reduce off-axis loading on the retractor.

In another embodiment of the present disclosure, a restraint system for a vehicle is provided, comprising: a seat belt retractor including a retractable seat belt; an energy management loop including a bracket welded to a chassis of the vehicle, the bracket including an integral loop extending from the bracket and having a seat belt opening to receive the retractable seat belt; wherein the bracket includes a plurality of openings positioned to receive a corresponding plurality of bolts for attaching a roll hoop to the bracket and a retractor mounting opening positioned to receive a bolt for mounting the retractor to the bracket. In one aspect of this embodiment, the retractor mounting opening includes an integral boss configured to receive the bolt for mounting the retractor to the bracket. In another aspect, the integral loop includes a seat belt guide segment extending from the bracket, a pair of curved end segments extending from the seat belt guide segment, and a straight segment extending between the pair of curved end segments, the seat belt guide segment, the pair of curved end segments and the straight segment forming the seat belt opening. In a variant of this aspect, the seat belt opening is substantially oval and has an elongated axis that is substantially parallel to the seat belt guide segment and the straight segment. In another variant, the integral loop further includes a curved lip that extends from the first curved end segment, the second curved end segment, and the straight segment around the perimeter of the seat belt opening. In a further variant, the curved lip extends forwardly away from the bracket and includes an inner convex surface that faces the seat belt opening. In still another variant, the seat belt guide segment of the integral loop includes a curved flange that is integral with the curved lip and extends outwardly and downwardly from the bracket, the curved flange including an upper convex surface that faces the seat belt opening. In another aspect of this embodiment, the integral loop is positioned relative to the retractor to reduce off-axis loading on the retractor. In yet another aspect, the bracket includes an inner mounting portion including a first pair of openings for receiving a first pair of bolts for mounting the roll hoop to the bracket and an outer mounting portion including a second pair of openings for receiving a second pair of bolts for mounting the roll hoop to the bracket. In a variant of this aspect, the inner mounting portion is connected to the outer mounting portion by a forward connecting portion and a rearward connecting portion. In another variant, the integral loop extends from a forward edge of the inner mounting portion.

In yet another embodiment, the present disclosure provides a vehicle, comprising: a chassis; an energy management loop including a bracket welded to the chassis and an integral loop extending from the bracket; a seat belt retractor mounted to the bracket, the seat belt retractor including a retractable seat belt; and a roll hoop mounted to the bracket; wherein the integral loop extends substantially perpendicularly relative to the bracket forward of the seat belt retractor and includes a seat belt opening to receive the retractable seat belt. In one aspect of this embodiment, the bracket includes a plurality of openings positioned and sized to receive a corresponding plurality of bolts for attaching the roll hoop to the bracket, a retractor mounting opening, and a retractor engagement opening positioned to receive a positioning tang of the seat belt retractor to align the seat belt retractor with the retractor mounting opening. In a variant of this aspect, the retractor mounting opening includes an integral boss configured to receive a bolt for mounting the seat belt retractor to the bracket. In a further variant, the seat belt opening is substantially oval and has an elongated axis that is substantially parallel to the seat belt guide segment and the straight segment. In yet a further variant, the integral loop further includes a curved lip that extends from the first curved end segment, the second curved end segment, and the straight segment around the perimeter of the seat belt opening. In still a further variant, the curved lip extends forwardly away from the bracket and includes an inner convex surface that faces the seat belt opening. In another variant, the seat belt guide segment of the integral loop includes a curved flange that is integral with the curved lip and extends outwardly and downwardly from the bracket, the curved flange including an upper convex surface that faces the seat belt opening. In another aspect of this embodiment, the integral loop includes a seat belt guide segment extending from the bracket, a pair of curved end segments extending from the seat belt guide segment, and a straight segment extending between the pair of curved end segments, the seat belt guide segment, the pair of curved end segments and the straight segment forming the seat belt opening. In another aspect, the bracket includes an inner mounting portion including a first pair of openings for receiving a first pair of bolts for mounting the roll hoop to the bracket and an outer mounting portion including a second pair of openings for receiving a second pair of bolts for mounting the roll hoop to the bracket. In a variant of this aspect, the inner mounting portion is connected to the outer mounting portion by a forward connecting portion and a rearward connecting portion. In another variant, the integral loop extends from a forward edge of the inner mounting portion. In another aspect, the integral loop is positioned relative to the retractor to reduce off-axis loading on the retractor.

BRIEF DESCRIPTION OF THE DRAWINGS

The drawings described herein are for illustrative purposes only of selected embodiments and not all possible implementations, and are not intended to limit the scope of the present disclosure.

FIG. 7 is a perspective view of an energy management loop according to another embodiment of the present disclosure; and FIG. 8 is another perspective view of the energy management loop of FIG. 7.

Corresponding reference numerals indicate corresponding parts throughout the several views of the drawings.

DETAILED DESCRIPTION

Figure 1:
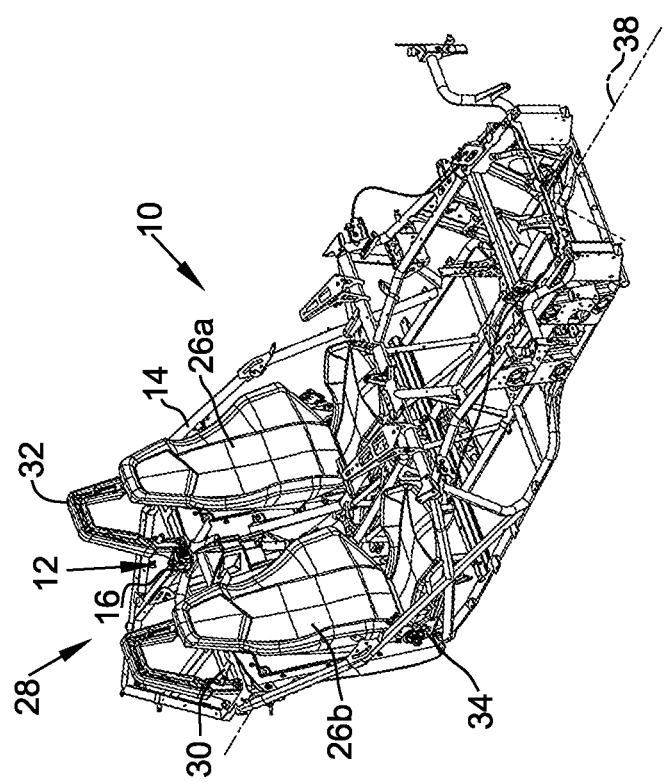
FIG. 1 is a perspective view of a chassis of an exemplary vehicle.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples," "coupled," "coupler," and variations thereof are used to include both arrangements wherein two or more components are in direct physical contact and arrangements wherein the two or more components are not in direct contact with each other (e.g., the components are "coupled" via at least a third component, but still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

Figure 2:
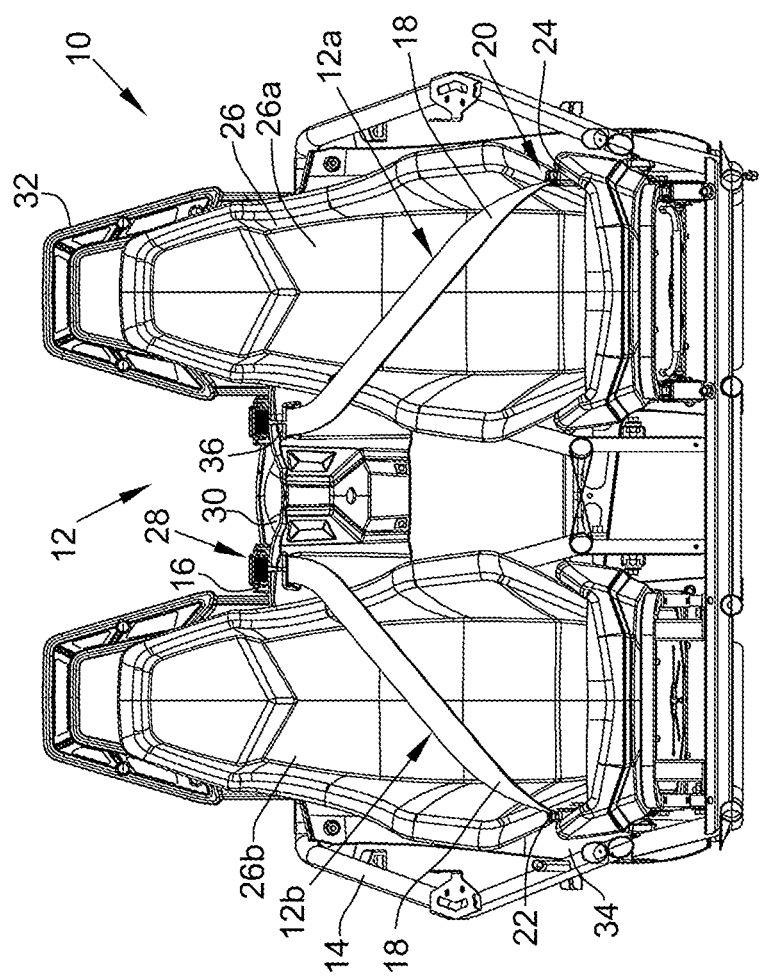
FIG. 2 is a front elevational view of the vehicle of FIG. 1 illustrating the seat belts extended and latched.

Referring to FIGS. 1 and 2, an exemplary vehicle 10 is illustrated that includes a restraint system 12. The restraint system 12 is secured to a chassis 14 of the vehicle 10. The restraint system 12 includes a retractor 16 having a retractable seat belt 18. The retractor 16 is a parcel shelf mount type bottom exit retractor that is available through IMMI of Westfield, Indiana. Other types of conventional retractors can also be used in the restraint system 12. The restraint system 12 also includes a latch assembly 20 that includes a seat belt latch 22 and a fixed vehicle latch 24, such that the seat belt latch 22 can be latched and unlatched to the vehicle latch 24. The latch assembly 20 is a conventional latch system that is available through IMMI of Westfield, Indiana.

As illustrated in FIGS. 1 and 2, the vehicle 10 having the chassis 14 can include any number of occupant seats 26 to support and retain a vehicle occupant. As illustrated, the vehicle 10 is a two-passenger vehicle having a driver seat 26A and a passenger seat 26B, such as a Slingshot® vehicle manufactured by Polaris Industries of Medina, Minn. Accordingly, there is a driver restraint system 12A and a passenger restraint system 12B.

Each retractor 16 is secured to the chassis 14 at a first retractor mounting position 28 that is along a rear support frame 30 and adjacent to a pair of roll hoops or bars 32. The latch assembly 20 is coupled to a seat mounting frame 34. The seat belt 18 extends between the retractor 16 and the latch assembly 20 and passes through a T-slot 36. As illustrated in FIG. 1, the vehicle 10 extends along a longitudinal axis 38 and the retractor 16 retracts and extends the seat belt 18 generally along the axis 38. Additionally, forward loading forces on the retractor 16 are also generally along the axis 38.

Figure 3:
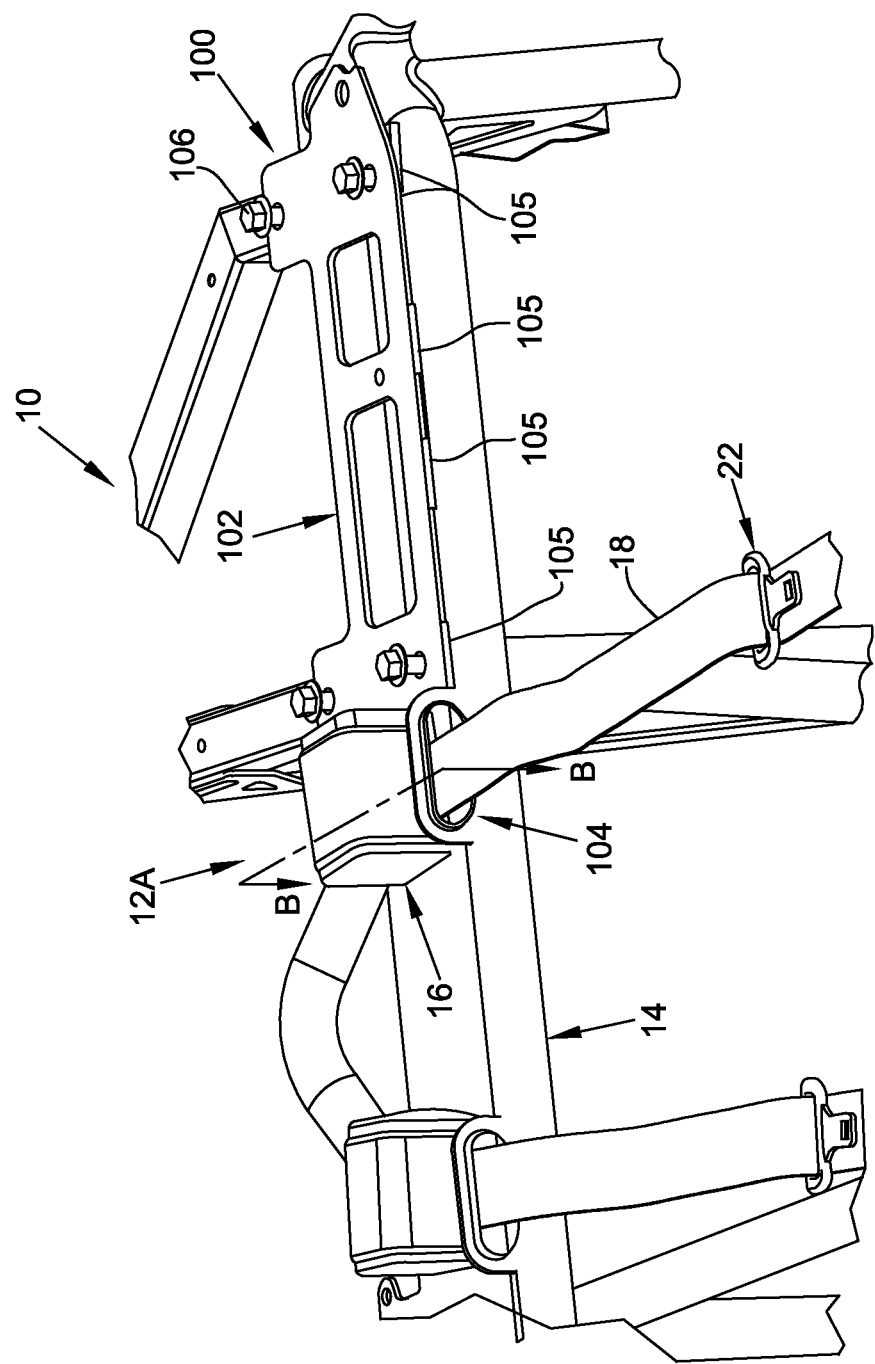
FIG. 3 is a perspective view of an energy management loop according to one embodiment of the present disclosure attached to a chassis of a vehicle.

Referring now to FIG. 3, one embodiment of an integrated seat belt energy management loop according to the present disclosure is shown. In certain applications, an energy management loop 100 is used for both the driver restraint system 12A and the passenger restraint system 12B, but for simplicity only an energy management loop 100 as part of the driver restraint system 12A is described. In certain applications, the energy management loop 100 provided as part of the passenger restraint system 12B is a mirror image of the energy management loop 100 of the driver restraint system 12A.

The energy management loop 100 generally includes a bracket 102 and an integral loop 104. In certain embodiments, the energy management loop 100 may be formed from metal in a stamping and forming process. Once formed, the bracket 102 is welded to the chassis 14 at a plurality of weld locations 105. In other embodiments, the bracket 102 may be attached to the chassis 14 using other attachment mechanisms such as bolts, for example. As shown in the figures, the bracket 102 is attached to the chassis 14 at a location substantially corresponding to the mounting location of the roll hoop 32 (FIGS. 1 and 2). The roll hoop 32 is attached to the bracket 102 using a plurality of bolts 106. In the depicted embodiment, the roll hoop 23 is attached to the bracket 102 using four bolts 106. In other embodiments, more or fewer bolts 106 may be used. The integral loop 104 of the energy management loop 100 extends from the bracket 102 adjacent the mounting location of the retractor 16 of the driver restraint system 12A such that the retractable seat belt 18 extends through the integral loop 104. In the depicted example, the integral loop 104 is located to correspond to the location of the retractable seat belt 18 of a bottom exit retractor 16. It should be understood, however, that the integral loop 104 of the energy management loop 100 could be extended upwardly away from the bracket 102 to be located to correspond to the location of the retractable seat belt 18 of a top exit retractor or a retractor with a retractable seat belt 18 that exits at some location between the bottom and the top of the retractor 16.

Figure 4:
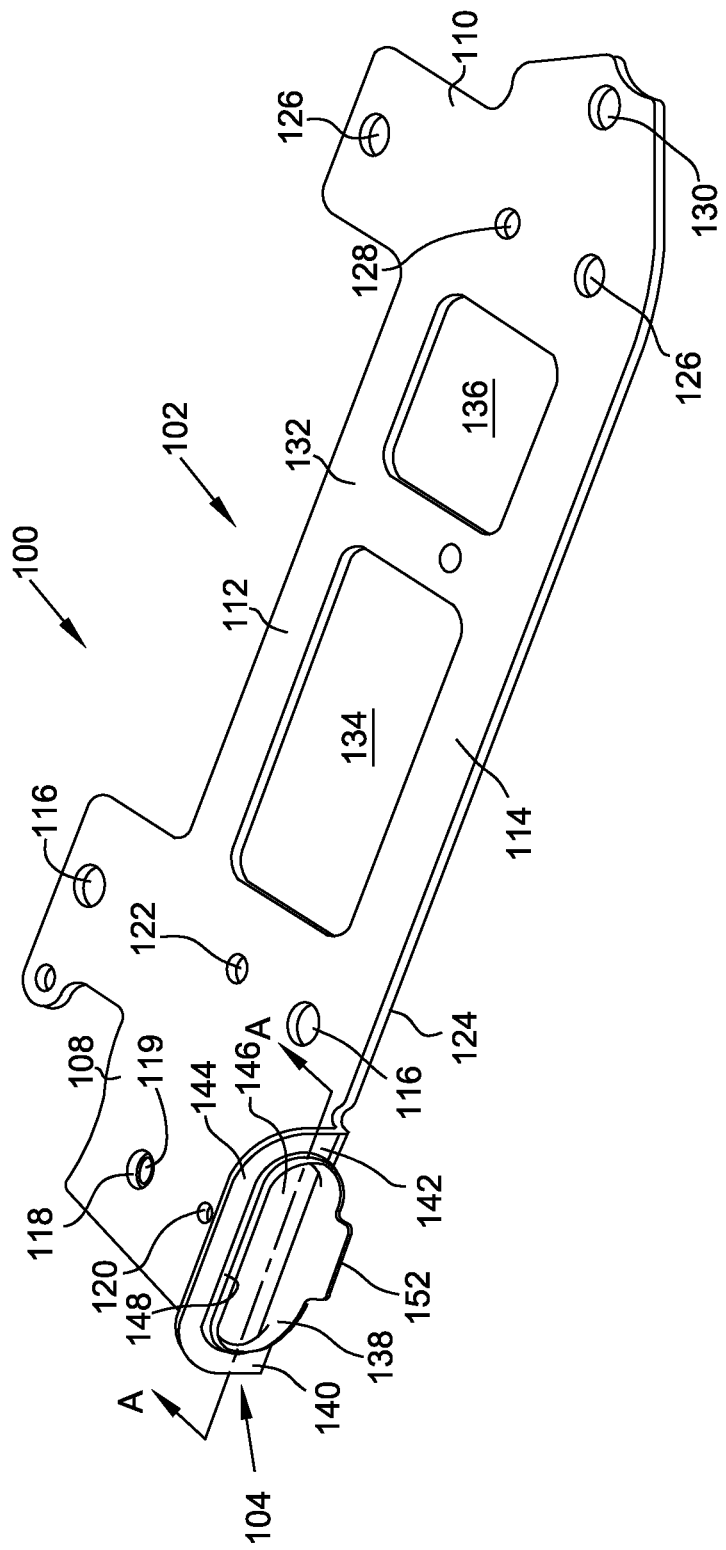
FIG. 4 is a perspective view of the energy management loop depicted in FIG. 3.

Referring now to FIG. 4, the energy management loop 100 is shown in more detail. The bracket 102 of the energy management loop 100 is generally formed as a substantially flat plate having an inner mounting portion 108, an outer mounting portion 110, a rearward connecting portion 112 extending between the inner mounting portion 108 and the outer mounting portion 110, and a forward connecting portion 114 extending between the inner mounting portion 108 and the outer mounting portion 110. The inner mounting portion 108 includes a pair of openings 116 sized to receive the bolts 106 for attaching the roll hoop 32 to the bracket 102, a retractor mounting opening 118, a retractor engagement opening 120, and a tooling hole 122 for use in manufacturing. It should be understood that the openings 116 may be positioned on the inner mounting portion 108 at different locations to accommodate mounting of roll hoops 32 having different mounting locations. The integral loop 104 extends from a forward edge 124 of the inner mounting portion 108 in substantially perpendicular relation to the inner mounting portion 108. The retractor mounting opening 118 includes an integral boss 119 for mounting the retractor 16 to the inner mounting portion 108 of the bracket 102 as is further described below.

The outer mounting portion 110 of the bracket 102 also includes a pair of openings 126 sized to receive the bolts 106 for attaching the roll hoop 32 to the bracket 102. The outer mounting portion 110 further includes tooling holes 128 and 130 for use in manufacturing and outer openings 134 and 136 for weight reduction for weight reduction.

As indicated above, the rearward connecting portion 112 of the bracket 102 extends between the inner mounting portion 108 and the outer mounting portion 110. The forward connecting portion 114 also extends between the inner mounting portion 108 and the outer mounting portion 110 in substantially parallel relation to the rearward connecting portion 112. The rearward connecting portion 112 is connected to the forward connecting portion 114 by a cross member 132 which is substantially perpendicular relative to the rearward connecting portion 112 and the forward connecting portion 114. In this configuration, the rearward connecting portion 112, the inner mounting portion 108, the forward connecting portion 114 and the cross member 132 form an inner opening 134 through the bracket 102, and the rearward connecting portion 112, the outer mounting portion 110, the forward connecting portion 114 and the cross member 132 form an outer opening 136 through the bracket 102. Inner opening 134 and outer opening 136 reduce the weight of the bracket 102.

Figure 5:
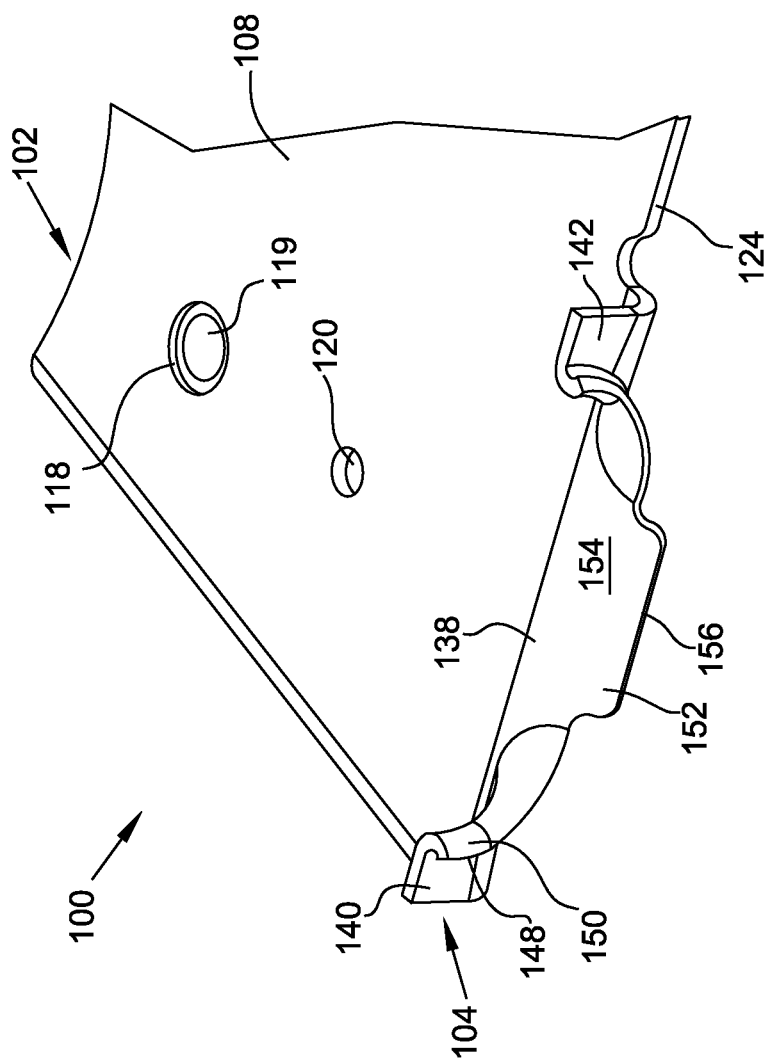
FIG. 5 is a perspective, cross-sectional view taken along line A-A of FIG. 4 depicting a portion of the energy management loop depicted in FIG. 4.

The integral loop 104 of the energy management loop 100 is rigidly formed as an integral component of the bracket 102 and generally includes a seat belt guide segment 138 extending from the inner mounting portion 108 of the bracket 102, a first curved end segment 140 extending from one end of the seat belt guide segment 138, a second curved end segment 142 extending from another end of the seat belt guide segment 138 opposite the one end, and a straight segment 144 extending between the first curved end segment 140 and the second curved end segment 142 in substantially parallel relation to the seat belt guide segment 138. In this configuration, the seat belt guide segment 138, the first curved end segment 140, the second curved end segment 142 and the straight segment 144 form a seat belt opening 146 through which the retractable seat belt 18 extends when the energy management loop 100 and the retractor 16 are mounted to the chassis 14 as shown in FIG. 3. As shown, the seat belt opening 146 is substantially oval in shape having an elongated axis that is substantially parallel to the seat belt guide segment 138 and the straight segment 144. A substantially continuous rolled edge or curved lip 148 extends forwardly away from the bracket 102 from the first curved end segment 140, the second curved end segment 142 and the straight segment 144 around a portion of the perimeter of the seat belt opening 146. The curved lip 148 includes an inner convex surface 150 that faces the seat belt opening 146 as best shown in FIG. 5. The seat belt guide segment 138 is integral with the curved lip 148 to guide the retractable seat belt 18 as is further described below.

Referring now to FIG. 5, which is a partial cross-sectional view of the energy management loop 100 taken along line A-A of FIG. 4, the seat belt guide segment 138 includes a curved flange 152 that extends outwardly and downwardly from the inner mounting portion 108 of the bracket 102. The curved flange 152 includes an upper convex surface 154 that faces the seat belt opening 146 and is engaged by the retractable seat belt 18 when the energy management loop 100 is installed and in use. The curved flange 152 projects outwardly from the curved lip 148 to an outer projection 156 and provides a gradual and substantial guiding surface for the retractable seat belt 18 as it is fed out from and retracted into the retractor 16.

Figure 6:
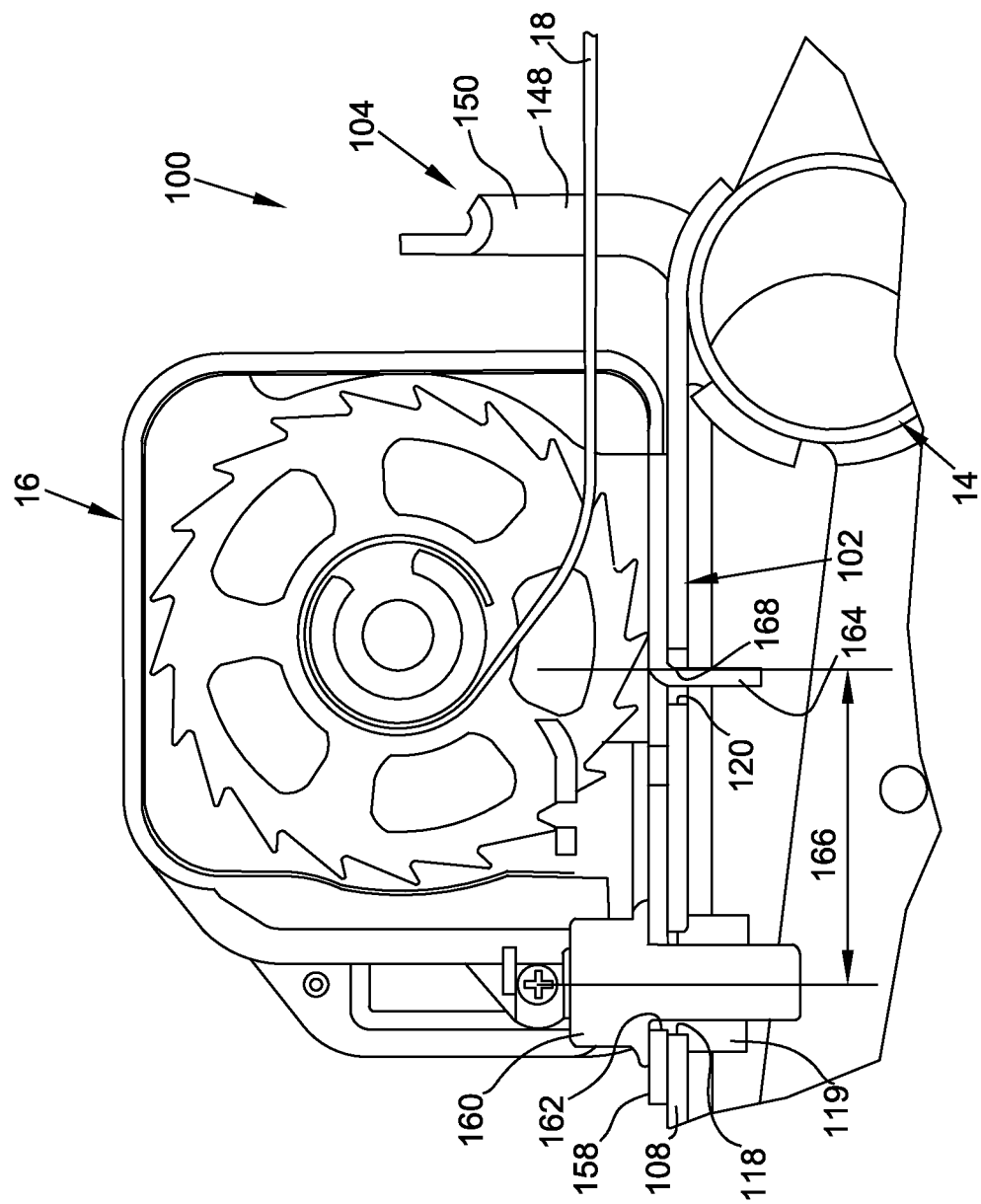
FIG. 6 is a side, cross-sectional view taken along line B-B of FIG. 3.

Referring now to FIG. 6, which is a cross-sectional view taken along line B-B of FIG. 3, the energy management loop 100 and the retractor 16 are shown as installed onto the chassis 14. As shown, the integral loop 104 of the energy management loop 100 is positioned forwardly of the retractor 16 to receive the retractable seat belt 18. After the energy management loop 100 (in particular, the bracket 102) is attached to chassis 14 (FIG. 3), the retractor 16 which is connected to a retractor plate 158 is attached to the bracket 102 using a bolt 160. More specifically, the retractor plate 158 includes a bolt opening 162 and a downwardly projecting positioning tang 164. The retractor plate 158 is positioned onto the inner mounting portion 108 of the bracket 102 such that the positioning tang 164 extends into the retractor engagement opening 120 of the inner mounting portion 108 and the bolt opening 162 is aligned with the retractor mounting opening 118. The bolt 160 is then passed through the bolt opening 162 of the retractor plate 158 and the retractor mounting opening 118 of the inner mounting portion 108, and threaded into internal threads (not shown) of the integral boss 119 of the inner mounting portion 108. As shown, the positioning tang 164 is located a distance 166 from the center of the bolt opening 162 of the retractor plate 158 such that when the positioning tang 164 engages a forward surface 168 of the retractor engagement opening 120 the center of the bolt opening 162 will align with the center of the retractor mounting opening 118 and a central axis of the integral boss 119.

The present embodiments of the energy management loop 100 reduce off-axis loading of the retractor 16 due to side loading traverse to the axis 38. In other words, the energy management loop 100 shares side transverse loads in the restraint system 12. The shape and location of the integral loop 104 of the energy management loop 100 is designed to redirect lateral force that is on the seat belt 18 during lateral loading of the vehicle (e.g., a side impact) from the retractor 16. The integral loop 104 does this without impeding normal belt movement during daily use and does not impede the forward retention of occupants but improves the strength of the restraint system 12 in off-side or off-axis loading.

The radius of the convex surface 150 of the curved lip 148 is formed to prevent fraying or cutting of the seat belt 18 but allows the belt to withstand off-axis loads. The distance between the first curved end segment 140 and the second curved end segment 142 of the integral loop 104 is designed to slidably accommodate the width of the retractable seat belt 18 to allow easy retraction and extension of the seat belt 18 without increasing the force required for either movement. The configuration of the integral loop 104 also allows the seat belt 18 to ride slightly onto the radius of the end segments 140, 142 in order to make the position of the seat belt 18 more consistent and predictable.

Additionally, the present energy management loop 100 provides the above-described features without requiring additional parts. In other words, a bracket similar to the bracket 102 of the energy management loop 100 is typically included as part of the chassis 14 and the integration of the integral loop 104 of the energy management loop 100 as part of such a bracket does not increase the part count of the vehicle 10. Moreover, no additional assembly steps are required.

Referring now to FIGS. 7 and 8, another embodiment of an integrated seat belt energy management loop 200 according to the present disclosure is shown. In certain applications, the energy management loop 200 may be used instead of the energy management loop 100 as part of the driver restraint system 12A and/or the passenger restraint system 12B (both shown elsewhere), but for simplicity only an energy management loop 200 as part of the driver restraint system 12A is shown and described. In certain applications, the energy management loop 200 provided as part of the passenger restraint system 12B is a mirror image of the energy management loop 200 of the driver restraint system 12A.

The energy management loop 200 is generally similar to the energy management loop 100. More specifically, the energy management loop 200 includes a bracket 202 and an integral loop 204. The bracket 202 is welded to the chassis 14 at a plurality of weld locations 105 (shown elsewhere). The integral loop 204 of the energy management loop 200 extends from the bracket 202 adjacent the mounting location of the retractor 16 (shown elsewhere) of the driver restraint system 12A such that the retractable seat belt 18 (shown elsewhere) extends through the integral loop 204. The bracket 202 generally includes a plurality of openings 206 sized to receive bolts (not shown) for attaching the roll hoop 32 (not shown) to the bracket 202, a retractor mounting opening 218, and a retractor engagement opening 220 (partially visible in FIG. 8). The integral loop 204 extends from a forward edge 222 of the bracket 202 and in substantially perpendicular relation to the bracket 202.

The integral loop 204 of the energy management loop 200 is rigidly formed as an integral component of the bracket 202 and generally includes a seat belt guide segment 224 extending from the bracket 202, a first curved end segment 226 extending from one end of the seat belt guide segment 224, a second curved end segment 228 extending from another end of the seat belt guide segment 224 opposite the first curved end segment 226, and a straight segment 230 extending between the first curved end segment 226 and the second curved end segment 228 in substantially parallel relation to the seat belt guide segment 224. In this configuration, the seat belt guide segment 224, the first curved end segment 226, the second curved end segment 228 and the straight segment 230 form a seat belt opening 232 through which the retractable seat belt 18 extends when the energy management loop 200 and the retractor 16 are mounted to the chassis 14. As shown, the seat belt opening 232 is substantially oval in shape having an elongated axis that is substantially parallel to the seat belt guide segment 224 and the straight segment 230. In certain embodiments, the seat belt opening 232 has a relatively large width along the elongated axis (that is, between the first curved end segment 226 and the second curved end segment 228) compared to the seat belt opening 146 of the energy management loop 100, for example in range of 2.5 in. to 3.5 in. A substantially continuous rolled edge or curved lip 234 extends forwardly away from the bracket 202 from the first curved end segment 226, the second curved end segment 228 and the straight segment 230 around a portion of the perimeter of the seat belt opening 232. The integral loop 204 further includes a reinforcement segment 236 extending away from the first curved end segment 226. In certain embodiments and as illustrated, the reinforcement segment 236 includes a dog-leg shape as viewed from above.

The seat belt guide segment 224 includes a curved flange 238 that extends outwardly and downwardly from the bracket 202. The curved flange 238 includes an upper convex surface 240 that faces the seat belt opening 232 and is engaged by the retractable seat belt 18 when the energy management loop 200 is installed and in use. The curved flange 238 projects outwardly from the curved lip 234 and provides a gradual and substantial guiding surface for the retractable seat belt 18 as it is fed out from and retracted into the retractor 16. In certain embodiments, the curved flange 238 has a relatively large width parallel to the elongated axis compared to the curved flange 152 of the energy management loop 100, for example in range of 0.5 in. to 1.5 in.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seat belt energy management loop, comprising:
a substantially flat bracket having a plurality of openings positioned and sized to receive a corresponding plurality of bolts for attaching a roll hoop to the bracket, a retractor mounting opening, and a retractor engagement opening positioned to receive a positioning tang of a retractor to align the retractor with the retractor mounting opening; and
an integral loop formed as an integral part of the bracket and extending from the bracket in substantially perpendicular relation to the bracket, the integral loop including a seat belt guide segment extending from the bracket, a pair of curved end segments extending from the seat belt guide segment, and a straight segment extending between the pair of curved end segments, the seat belt guide segment, the pair of curved end segments and the straight segment forming a seat belt opening through which a retractable seat belt of the retractor extends when the bracket is attached to a chassis of a vehicle.

2. The seat belt energy management loop of claim 1, wherein the bracket is configured to be welded to the chassis of the vehicle.

3. The seat belt energy management loop of claim 1, wherein the bracket includes an inner mounting portion including a first pair of openings for receiving a first pair of bolts for mounting the roll hoop to the bracket and an outer mounting portion including a second pair of openings for receiving a second pair of bolts for mounting the roll hoop to the bracket.

4. The seat belt energy management loop of claim 3, wherein the inner mounting portion is connected to the outer mounting portion by a forward connecting portion and a rearward connecting portion.

5. The seat belt energy management loop of claim 3, wherein the integral loop extends from a forward edge of the inner mounting portion.

6. The seat belt energy management loop of claim 1, wherein the retractor mounting opening includes an integral boss configured to receive a bolt for mounting the retractor to the bracket.

7. The seat belt energy management loop of claim 1, wherein the seat belt opening is substantially oval and has an elongated axis that is substantially parallel to the seat belt guide segment and the straight segment.

8. The seat belt energy management loop of claim 1, wherein the integral loop further includes a curved lip that extends from the first curved end segment, the second curved end segment, and the straight segment around the perimeter of the seat belt opening.

9. The seat belt energy management loop of claim 8, wherein the curved lip extends forwardly away from the bracket and includes an inner convex surface that faces the seat belt opening.

10. The seat belt energy management loop of claim 8, wherein the seat belt guide segment of the integral loop includes a curved flange that is integral with the curved lip and extends outwardly and downwardly from the bracket, the curved flange including an upper convex surface that faces the seat belt opening.

11. The seat belt energy management loop of claim 1, wherein the integral loop is positioned relative to the retractor to reduce off-axis loading on the retractor.

12. A restraint system for a vehicle, comprising:
a seat belt retractor including a retractable seat belt;
an energy management loop including a bracket welded to a chassis of the vehicle, the bracket including an integral loop extending from the bracket and having a seat belt opening to receive the retractable seat belt;
wherein the bracket includes a plurality of openings positioned to receive a corresponding plurality of bolts for attaching a roll hoop to the bracket and a retractor mounting opening positioned to receive a bolt for mounting the retractor to the bracket.

13. The restraint system of claim 12, wherein the retractor mounting opening includes an integral boss configured to receive the bolt for mounting the retractor to the bracket.

14. The restraint system of claim 12, wherein the integral loop includes a seat belt guide segment extending from the bracket, a pair of curved end segments extending from the seat belt guide segment, and a straight segment extending between the pair of curved end segments, the seat belt guide segment, the pair of curved end segments and the straight segment forming the seat belt opening.

15. The restraint system of claim 14, wherein the seat belt opening is substantially oval and has an elongated axis that is substantially parallel to the seat belt guide segment and the straight segment.

16. The restraint system of claim 14, wherein the integral loop further includes a curved lip that extends from the first curved end segment, the second curved end segment, and the straight segment around the perimeter of the seat belt opening.

17. The restraint system of claim 16, wherein the curved lip extends forwardly away from the bracket and includes an inner convex surface that faces the seat belt opening.

18. The restraint system of claim 16, wherein the seat belt guide segment of the integral loop includes a curved flange that is integral with the curved lip and extends outwardly and downwardly from the bracket, the curved flange including an upper convex surface that faces the seat belt opening.

19. The restraint system of claim 12, wherein the integral loop is positioned relative to the retractor to reduce off-axis loading on the retractor.

20. The restraint system of claim 12, wherein the bracket includes an inner mounting portion including a first pair of openings for receiving a first pair of bolts for mounting the roll hoop to the bracket and an outer mounting portion including a second pair of openings for receiving a second pair of bolts for mounting the roll hoop to the bracket.

21. The restraint system of claim 20, wherein the inner mounting portion is connected to the outer mounting portion by a forward connecting portion and a rearward connecting portion.

22. The restraint system of claim 20, wherein the integral loop extends from a forward edge of the inner mounting portion.

23. A vehicle, comprising:
a chassis;
an energy management loop including a bracket welded to the chassis and an integral loop extending from the bracket;
a seat belt retractor mounted to the bracket, the seat belt retractor including a retractable seat belt; and
a roll hoop mounted to the bracket;
wherein the integral loop extends substantially perpendicularly relative to the bracket forward of the seat belt retractor and includes a seat belt opening to receive the retractable seat belt.

24. The vehicle of claim 23, wherein the bracket includes a plurality of openings positioned and sized to receive a corresponding plurality of bolts for attaching the roll hoop to the bracket, a retractor mounting opening, and a retractor engagement opening positioned to receive a positioning tang of the seat belt retractor to align the seat belt retractor with the retractor mounting opening.

25. The vehicle of claim 24, wherein the retractor mounting opening includes an integral boss configured to receive a bolt for mounting the seat belt retractor to the bracket.

26. The vehicle of claim 25, wherein the seat belt opening is substantially oval and has an elongated axis that is substantially parallel to the seat belt guide segment and the straight segment.

27. The vehicle of claim 25, wherein the integral loop further includes a curved lip that extends from the first curved end segment, the second curved end segment, and the straight segment around the perimeter of the seat belt opening.

28. The vehicle of claim 27, wherein the curved lip extends forwardly away from the bracket and includes an inner convex surface that faces the seat belt opening.

29. The vehicle of claim 27, wherein the seat belt guide segment of the integral loop includes a curved flange that is integral with the curved lip and extends outwardly and downwardly from the bracket, the curved flange including an upper convex surface that faces the seat belt opening.

30. The vehicle of claim 23, wherein the integral loop includes a seat belt guide segment extending from the bracket, a pair of curved end segments extending from the seat belt guide segment, and a straight segment extending between the pair of curved end segments, the seat belt guide segment, the pair of curved end segments and the straight segment forming the seat belt opening.

31. The vehicle of claim 23, wherein the bracket includes an inner mounting portion including a first pair of openings for receiving a first pair of bolts for mounting the roll hoop to the bracket and an outer mounting portion including a second pair of openings for receiving a second pair of bolts for mounting the roll hoop to the bracket.

32. The vehicle of claim 31, wherein the inner mounting portion is connected to the outer mounting portion by a forward connecting portion and a rearward connecting portion.

33. The vehicle of claim 31, wherein the integral loop extends from a forward edge of the inner mounting portion.

34. The vehicle of claim 23, wherein the integral loop is positioned relative to the retractor to reduce off-axis loading on the retractor.

* * * * *